United States Patent
Wang et al.

(10) Patent No.: US 10,614,553 B1
(45) Date of Patent: Apr. 7, 2020

(54) METHOD FOR SPHERICAL CAMERA IMAGE STITCHING

(71) Applicant: National Chiao Tung University, Hsinchu (TW)

(72) Inventors: Shih Ching Wang, Hsinchu (TW); Hsueh Ming Hang, Hsinchu (TW); Shaw Hwa Hwang, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 16/414,844

(22) Filed: May 17, 2019

(51) Int. Cl.
| | |
|---|---|
| *H04N 7/00* | (2011.01) |
| *G06T 3/40* | (2006.01) |
| *H04N 5/232* | (2006.01) |
| *H04N 5/265* | (2006.01) |
| *G06T 7/33* | (2017.01) |
| *G06T 5/00* | (2006.01) |
| *G06T 3/00* | (2006.01) |
| *H04N 5/262* | (2006.01) |

(52) U.S. Cl.
CPC .......... *G06T 3/4038* (2013.01); *G06T 3/0018* (2013.01); *G06T 5/006* (2013.01); *G06T 7/33* (2017.01); *H04N 5/23238* (2013.01); *H04N 5/265* (2013.01); *H04N 5/2622* (2013.01)

(58) Field of Classification Search
CPC ......... G06T 3/4038; G06T 7/33; G06T 5/006; G06T 3/0018; H04N 5/2622; H04N 5/265; H04N 5/23238
USPC ........................................................ 348/36
See application file for complete search history.

(56) References Cited

U.S. PATENT DOCUMENTS

| | | | | |
|---|---|---|---|---|
| 6,733,136 | B2 * | 5/2004 | Lantz | H04N 9/3141 348/36 |
| 6,947,059 | B2 * | 9/2005 | Pierce | H04N 5/23238 345/629 |
| 7,834,910 | B2 * | 11/2010 | DeLorme | G03B 41/00 348/218.1 |
| 2002/0196538 | A1 * | 12/2002 | Lantz | H04N 9/3141 359/443 |
| 2004/0257384 | A1 * | 12/2004 | Park | H04N 5/232 345/646 |
| 2011/0018964 | A1 * | 1/2011 | Krishnan | G02B 13/06 348/36 |
| 2017/0280066 | A1 * | 9/2017 | Hayashi | H04N 5/23232 |
| 2018/0075635 | A1 * | 3/2018 | Choi | H04N 13/204 |
| 2018/0211443 | A1 * | 7/2018 | Abbas | G06T 19/003 |
| 2018/0276826 | A1 * | 9/2018 | Van Der Auwera | H04N 19/197 |
| 2018/0278936 | A1 * | 9/2018 | Hendry | H04N 19/176 |
| 2019/0045212 | A1 * | 2/2019 | Rose | H04N 19/172 |
| 2019/0104326 | A1 * | 4/2019 | Stockhammer | H04N 21/2343 |
| 2019/0141322 | A1 | 5/2019 | Abbas et al. | |
| 2019/0289302 | A1 * | 9/2019 | Abbas | H04N 19/147 |

\* cited by examiner

*Primary Examiner* — Helen Shibru
(74) *Attorney, Agent, or Firm* — Bacon & Thomas, PLLC

(57) ABSTRACT

The present invention provides a method for Spherical Camera Image Stitching. By using two fisheye lens to catch two fisheye images and then being developed into three pairs of flat figures based on Segmented Sphere Projection (SSP) method. Thereafter each corresponding pair is stitched based on a similar-edge method, and then three pairs are combined to form a panoramic image. At the end, the combined panoramic image is projected to a 3-D ball sphere space.

3 Claims, 6 Drawing Sheets

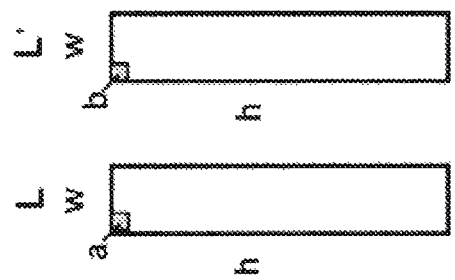
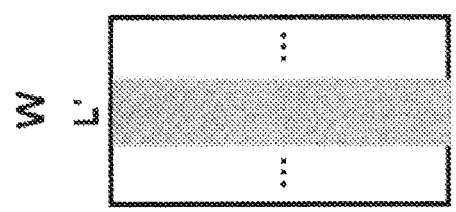
Fig. 5
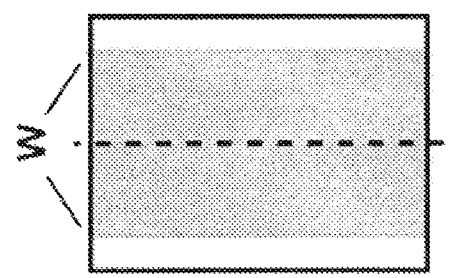
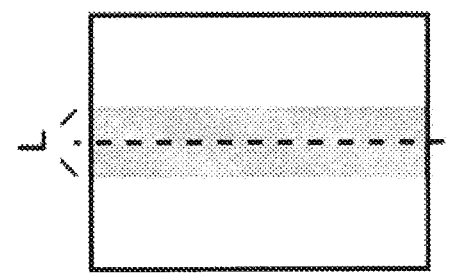

METHOD FOR SPHERICAL CAMERA IMAGE STITCHING

FIELD OF THE INVENTION

The present invention relates to a method for Spherical Camera Image Stitching, and more particularly to a Segmented Sphere Projection, SSP) method for stitching camera images based on a similar-edge technique, and then the stitched panoramic images are projected to a 3-D ball sphere space.

BACKGROUND OF THE INVENTION

Referring to FIG. 1, which is a schematic diagram for describing the prior art of Equirectangular Projection (ERP) method. Beginning from the top left, a fisheye camera 1 uses two fisheye lens 11, 12 back to back for catching images (step 1). Two fisheye pictures A and B are catched (step 2). The two fisheye pictures represent two hemispherical images respectively for having about 190°, so each has a loop 13, 14 about 5° at below respectively (step 3). The two hemispherical images are then spread into rectangular shapes to form two flat figures shown at the bottom left of FIG. 1 (step 4). This is so-called Equirectangular Projection (ERP) method of the prior art.

The two flat figures are each divided into two parts respectively, i.e. A-left, A-right and B-left, B-right. The left belt 131 of the A-left and the right belt 132 of the A-right are formed from the loop 13, each has about 10° (−95°~−85° and 85°~95°). The left belt 141 of the B-left and the right belt 142 of the B-right are formed from the loop 14, each has about 10° (−95°~−85° and 85°~95°).

The belt 132 and the belt 141 are stitched up, and the belt 131 and the belt 142 are stitched up, so as to form a panoramic image (step 5). At the end, the stitched panoramic image is projected to a 3-D ball sphere space to form a spherical panoramic picture (step 6).

The Equirectangular Projection (ERP) method is to transform spherical image into rectangular shape for forming two flat figures, so the arctic part and the antartic part have great distortion relative to the equator part.

SUMMARY OF THE INVENTION

The object of the present invention is to provide a method for Spherical Camera Image Stitching to improve the image distortion of the spherical arctic/antartic part relative to the equator part in great extent. A Segmented Sphere Projection (SSP) method is employed to divide the images into arctic part, antartic part and equator part, and then a similar-edge method and a feather blending method are used for stitching.

The present invention uses a fisheye camera with two fisheye lens back to back for catching images Two hemispherical fisheye images are catched for having about 190° respectively.

The two hemispherical fisheye images are each divided into three parts: arctic part, equator part and antartic part, with the boundary lines at north latitude +45 and south latitude −45°.

Then the arctic part and the antartic part of the two hemispherical fisheye images are transformed into semicircular shapes respectively.

The two semicircular shapes of the arctic part and the antartic part are stitched into a circular shape respectively by a similar-edge method.

A feather blending method is used for the overlapping area at stitching, and then the two circular shapes are transformed into spherical shapes to form the arctic part and the antartic part respectively.

The equator parts of the two hemispherical fisheye images are stitched by ERP method based on similar-edge method and feather blending method, and then combine the arctic part, the equator part and the antartic part to form a panoramic image.

At the end, the combined panoramic image is projected to a 3-D ball sphere space to form a spherical panoramic image.

BRIEF DESCRIPTION OF THE DRAWINGS

FIG. 5 shows schematically a similar-edge method according to the present invention.

DETAILED DESCRIPTIONS OF THE PREFERRED EMBODIMENTS

Figure 1:
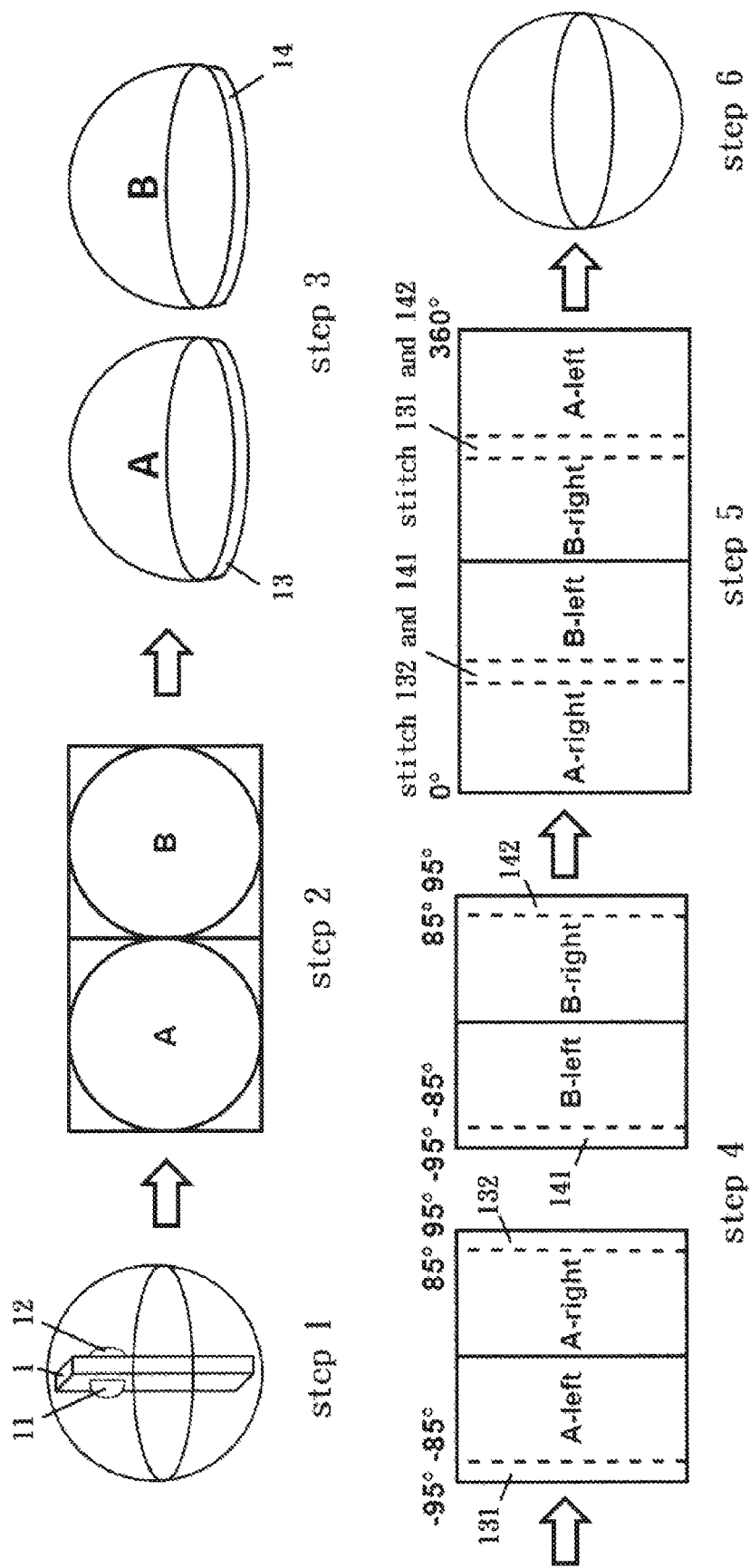
FIG. 1 shows schematically a diagram for describing the prior art of Equirectangular Projection (ERP) method.
Figure 2:
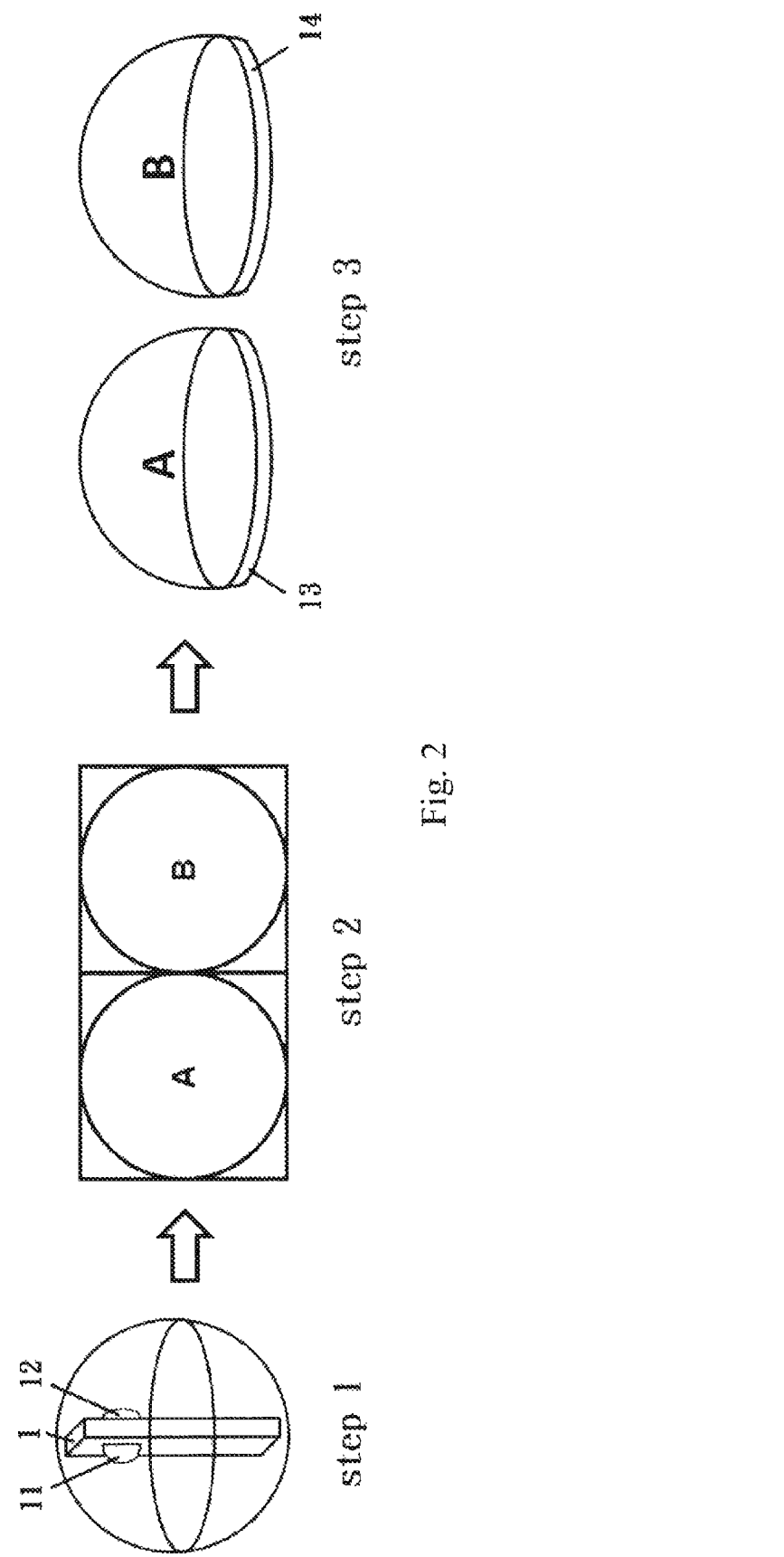
FIGS. 2, 3 and 4 show schematically a Segmented Sphere Projection (SSP) method according to the present invention.
Figure 3:
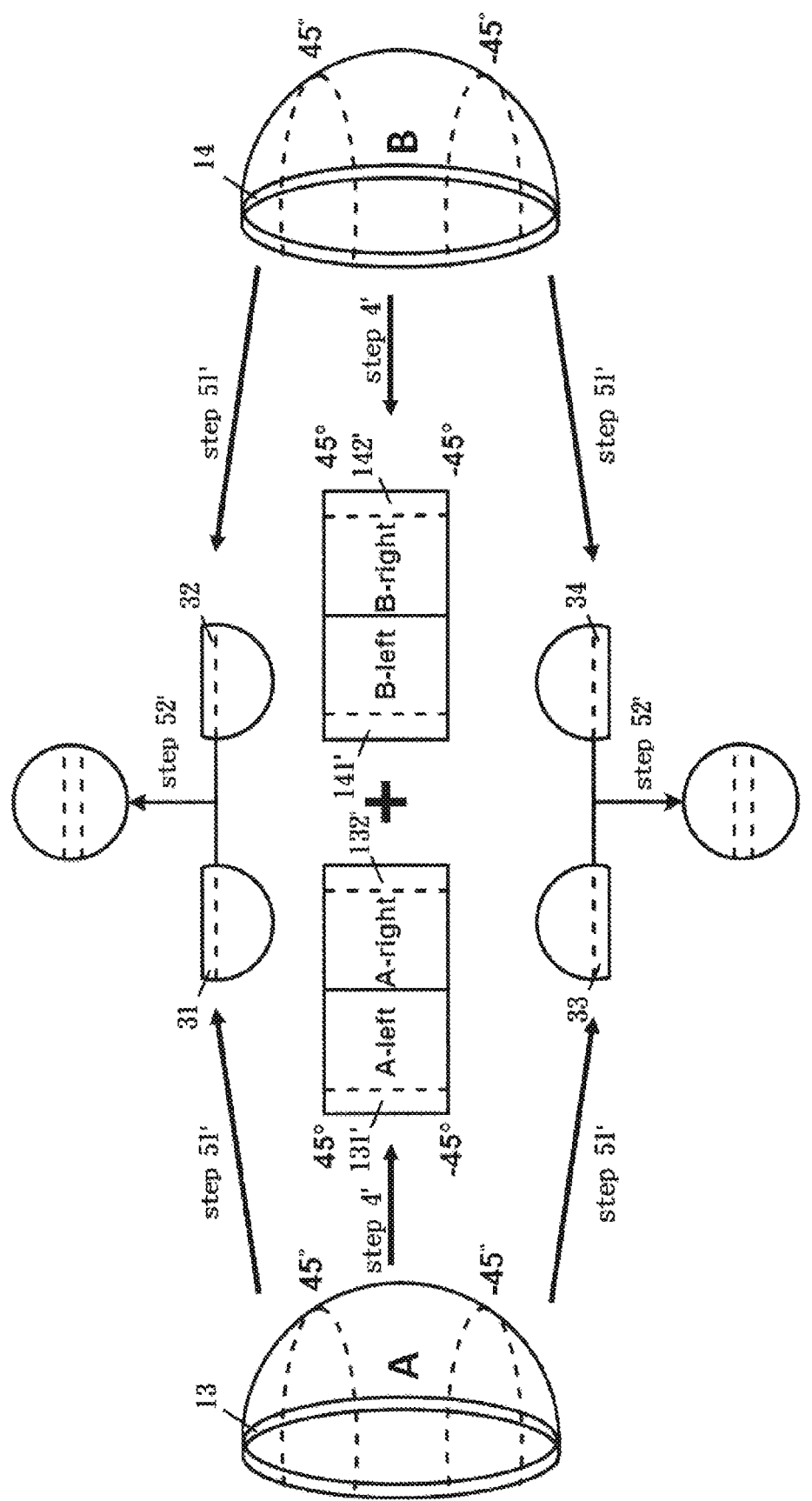
Figure 4:
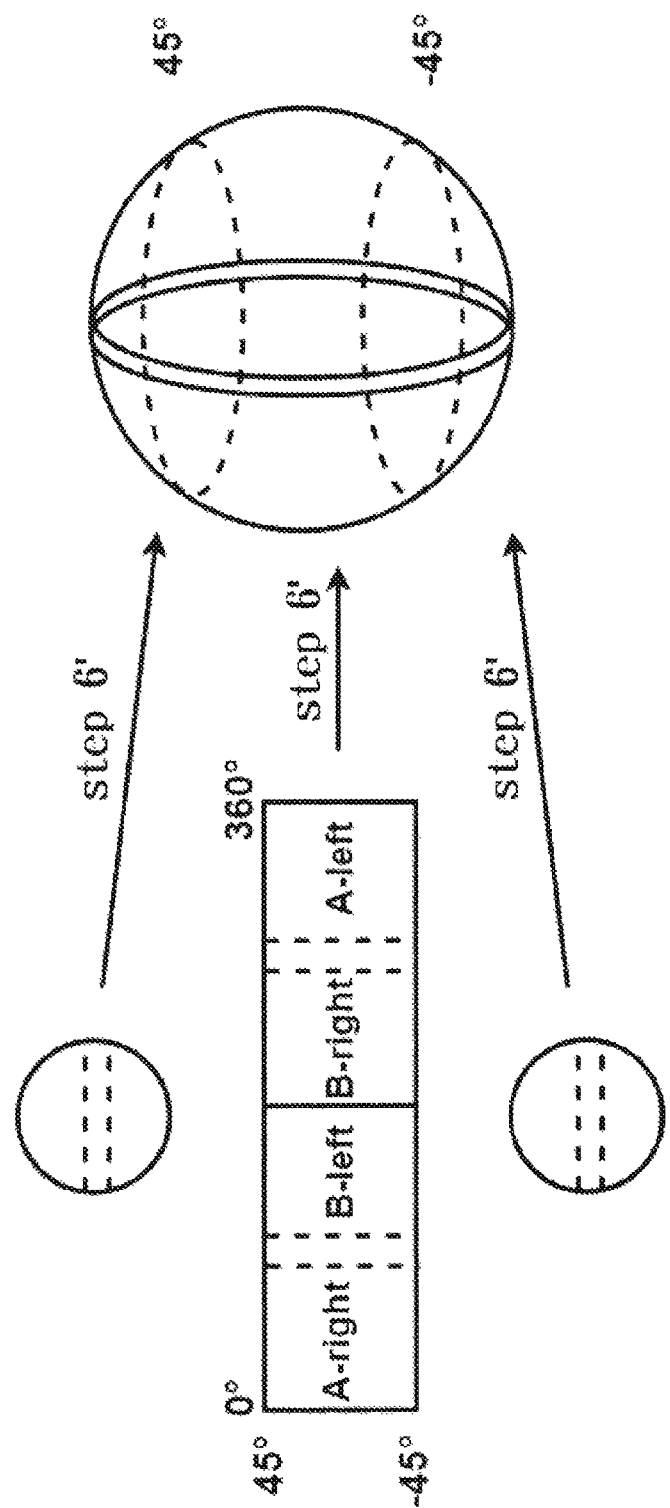

FIGS. 2, 3 and 4 show schematically a Segmented Sphere Projection (SSP) method according to the present invention. The steps in FIG. 2 are the same as the steps 1~3 in FIG. 1. The steps 4', 51' and 52' in FIG. 3 and the step 6' in FIG. 4 describe the SSP method according to the present invention.

Referring to FIG. 2, A fisheye camera 1 uses two fisheye lens 11, 12 back to back for catching images (step 1). Two fisheye pictures A and B are catched (step 2). The two fisheye pictures A and B represent two hemispherical images respectively for having about 190°, so each has a loop 13, 14 of about 5° at below respectively (step 3).

The steps 4', 51' and 52' in FIG. 3 describe the Segmented Sphere Projection (SSP) method according to the present invention. The two hemispherical fisheye images of step 3 in FIG. 2 are each divided into three parts: arctic part, equator part and antartic part, with the boundary lines at north latitude +45° and south latitude −45°.

Referring to steps 4' in FIG. 3, the equator parts of the two hemispherical fisheye images A and B are spreaded into rectangular shape by ERP method to form the two flat figures as shown in the center of FIG. 3

The arctic parts and the antartic parts of the two fisheye images A and B are transformed into semicircular shape respectively, as shown by step 51'.

Then the two arctic parts are stitched based on a similar-edge method and a feather blending method, i.e. the belt 31 and the belt 32 are stitched to form a circle (step 52').

The two antartic parts are stitched based on a similar-edge method and a feather blending method, i.e. the belt 33 and the belt 34 are stitched to form a circle (step 52').

Referring to FIG. 4, the equator parts of A-left, A-right and B-left, B-right in FIG. 3 are stitched as shown in FIG. 4 as A-right, B-left and B-right, A-left by similar-edge method and feather blending method, and then the three parts (arctic part, antartic part and equator part) are combined to form a panoramic image (step 6').

At the end, the combined panoramic image is projected to a 3-D ball sphere space.

The similar-edge method used by arctic part, antartic part and equator part for stitching is described as follows: Two regions for being stitched is performed with an edge detecting method. The edge detecting method will change the pixels of the images of the two regions into 1 or 0, 1 means edge, 0 means non-edge. A pixel is composed of red light brightness, green light brightness and blue light brightness (i.e, RGB images), with values between 0 to 255 to form various colors. While a grayscale image is simple from darkest black to multilevel gray to brightest white. RGB images can be average weighted to form grayscale images, and then to perform the edge detecting. Edge means where the brightness has significant change. The pixel which has significant brightness change is set as edge 1, others are set as non-edge 0. In this way, the data volume will be decreased significantly and still maintain the structural attribute of the images.

Referring to FIG. 5, two regions for being stitched (for example 31 and 32, or 33 and 34, or 132' and 141', or 131' and 142') are shown at left side of FIG. 5, each of the two regions will each take a range L (master match) and a range W (being matched) subject to the center respectively as shown. Move the range L on the range W to cover ranges L' of same width as L (shown at center of FIG. 5), and calculate the similarity between the range L and the ranges L', find the most similar range L', and then stitch the range L with the most similar range L'. The equation below shows the calculation for similarity, similarity closer to 1 is more similar, similarity equal to 1 is exactly the same, a and b are individual pixel edge values (1 or 0) in the range L and the ranges L' respectively (shown at right side of FIG. 5), h is the height of L and L', w is the width of L and L', i,j represent vertical coordinate value and horizontal coordinate value of the pixel respectively.

$$\text{Similarity} = 1 - \frac{\sum_{i=1}^{h}\sum_{j=1}^{w}|a_{i,j} - b_{i,j}|}{h \times w} \times 100\%$$

Figure 6:
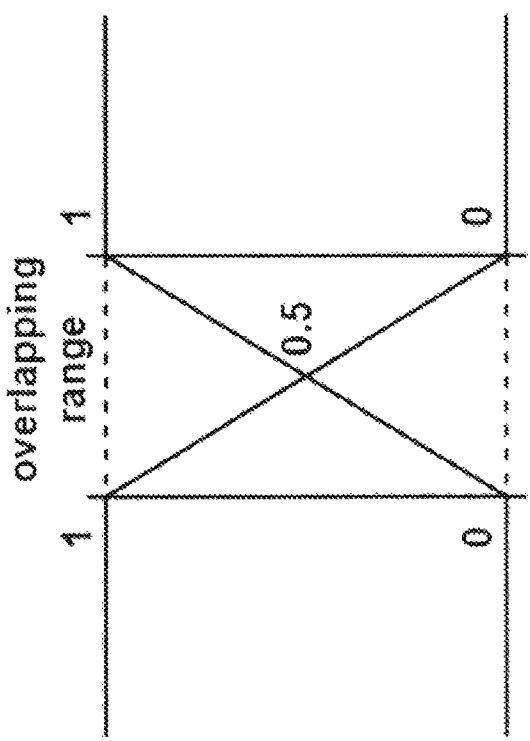
FIG. 6 shows schematically a feather blending method according to the present invention.

Referring to FIG. 6, the overlapping of the range L and the the most similar range L' is described. A weight diagram is established as shown. The range L is from left to overlap with the range L' from right, so the weight is 1 for the left side of range L and the weight is 0 for the right side of range L, and the weight is 0 for the right side of range L' and the weight is 1 for the left side of range L', the weight is 0.5 at the center. In this way, the overlapping of the range L and the the most similar range L' will be added up to 1, so the overlapping of the range L and the the most similar range L' is the most like the original images. This is so-called the feather blending method.

The scope of the present invention depends upon the following claims, and is not limited by the above embodiments.

What is claimed is:

1. A method for spherical camera image stitching, comprising steps as below:
    (a) using a fisheye camera with two fisheye lens back to back for catching two hemispherical fisheye images with 190° respectively;
    (b) said two hemispherical fisheye images are each divided into three parts: an arctic part, an equator part and an antartic part, with boundary lines at north latitude +45° and south latitude −45°;
    (c) said arctic part and said antartic part of said two hemispherical fisheye images are transformed into semicircular shapes respectively;
    (d) said two semicircular shapes of said arctic part and said antartic part are stitched into a circular shape respectively by a similar-edge method
    (e) a feather blending method is used for overlapping areas at stitching, and then said two circular shapes are transformed into spherical shapes to form a spherical arctic part and a spherical antartic part respectively;
    (f) said equator parts of said two hemispherical fisheye images are stitched by ERP method based on said similar-edge method said feather blending method, and then combine the arctic part, the equator part and the antartic part to form a panoramic image;
    (g) at the end, the combined panoramic image is projected to a 3-D ball sphere space to form a spherical panoramic image.

2. The method for spherical camera image stitching according to claim 1, wherein said similar-edge method is to let pixels of said fisheye images from RGB images to form grayscale images, and then let pixels which has significant brightness change to be set as edge 1, others are set as non-edge 0; two regions for being stitched will each take a range L (master match) and a range W (being matched) subject to the center thereof respectively; move the range L on the range W to cover ranges L' of same width as L, and calculate a similarity between the range L and the ranges L', find the most similar range L', and then stitch the range L with the most similar range L'; the equation below shows the calculation for similarity, similarity closer to 1 is more similar, similarity equal to 1 is exactly the same, a and b are individual pixel edge values (1 or 0) in the range L and the ranges L' respectively, h is the height of L and L', w is the width of L and L', i,j represent vertical coordinate value and horizontal coordinate value of the pixel respectively, $$\text{Similarity} = 1 - \frac{\sum_{i=1}^{h}\sum_{j=1}^{w}|a_{i,j} - b_{i,j}|}{h \times w} \times 100\%.$$

3. The method for spherical camera image stitching according to claim 2, wherein said feather blending method is to establish a weight diagram for the range L and the most similar range L', the range L is from left to overlap with the range L' from right, the weight is 1 for the left side of range L and the weight is 0 for the right side of range L, and the weight is 0 for the right side of range L' and the weight is 1 for the left side of range L', the weight is 0.5 at the center; in this way, the overlapping of the range L and the the most similar range L' will be added up to 1, so the overlapping of the range L and the the most similar range L' is the most like the original images.

* * * * *